(12) United States Patent
Miedl et al.

(10) Patent No.: US 12,212,109 B2
(45) Date of Patent: Jan. 28, 2025

(54) MEASUREMENT AND POSITIONING METHODS AND ARRANGEMENTS FOR ASSEMBLING AN ELECTRICAL CABLE

(71) Applicant: Rosenberger Hochfrequenztechnik GmbH & Co. KG, Fridolfing (DE)

(72) Inventors: Thomas Miedl, Tittmoning (DE); Walter Baldauf, Fridolfing (DE); Tobias Huber, Tittmoning (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 855 days.

(21) Appl. No.: 17/292,090

(22) PCT Filed: Nov. 6, 2019

(86) PCT No.: PCT/EP2019/080375
§ 371 (c)(1),
(2) Date: May 7, 2021

(87) PCT Pub. No.: WO2020/094707
PCT Pub. Date: May 14, 2020

(65) Prior Publication Data
US 2021/0399512 A1    Dec. 23, 2021

(30) Foreign Application Priority Data
Nov. 8, 2018   (DE) .................... 10 2018 127 969.8

(51) Int. Cl.
*H01R 43/052* (2006.01)
*G01B 7/14* (2006.01)
(Continued)

(52) U.S. Cl.
CPC ............. *H01R 43/052* (2013.01); *G01B 7/14* (2013.01); *G01B 11/14* (2013.01);
(Continued)

(58) Field of Classification Search
CPC .... H01R 43/052; H01R 43/20; H01R 9/0518; G01B 7/14; G01B 11/14; H01B 13/0003
See application file for complete search history.

(56) References Cited

U.S. PATENT DOCUMENTS 5,187,875 A * 2/1993 Kuehling ............... H01R 43/20
                                                    33/833
10,594,104 B2   3/2020 Höfling
(Continued)

FOREIGN PATENT DOCUMENTS

DE   102011105520 A1   12/2011
DE   102016122728 A1    5/2018
(Continued)

OTHER PUBLICATIONS

D. H. Kim et al., "Signal integrity analysis of vertical dual port coaxial connector for automotive system," 2016 IEEE 25th Conference on Electrical Performance of Electronic Packaging and Systems (EPEPS), San Diego, CA, USA, 2016, pp. 165-168. (Year: 2016).*
(Continued)

*Primary Examiner* — A. Dexter Tugbang
(74) *Attorney, Agent, or Firm* — Randall Danskin P.S.

(57) ABSTRACT

A measurement method for producing an electrical cable wherein an end-side end of a supporting sleeve that is secured to the electrical cable is brought into contact with a reference stop of a reference device. An axial distance between the end-side end of the supporting sleeve and an inner conductor part secured to an inner conductor of the electrical cable and the reference stop is detected, and a connection distance (y) between the front end of the inner conductor part and the end-side end of the supporting sleeve, facing the inner conductor part, is derived from the axial distance.

12 Claims, 5 Drawing Sheets

(51) Int. Cl.
*G01B 11/14* (2006.01)
*H01B 13/00* (2006.01)
*H01R 43/20* (2006.01)
*H01R 9/05* (2006.01)

(52) U.S. Cl.
CPC ......... *H01B 13/0003* (2013.01); *H01R 43/20* (2013.01); *H01R 9/0518* (2013.01)

(56) References Cited

U.S. PATENT DOCUMENTS

| | | |
|---|---|---|
| 2002/0102872 A1 | 8/2002 | Kanagawa |
| 2011/0318960 A1 | 12/2011 | Koga |
| 2013/0025121 A1 | 1/2013 | Van |
| 2015/0288153 A1 | 10/2015 | Baldauf |

FOREIGN PATENT DOCUMENTS

| | | | | |
|---|---|---|---|---|
| EP | 2814123 A1 | 12/2014 | | |
| JP | 2007018734 A | 1/2007 | | |
| JP | 2010153046 A | 7/2010 | | |
| JP | 2016162758 A | * 9/2016 | ............... | G01B 7/14 |
| WO | 2013034637 A1 | 3/2013 | | |

OTHER PUBLICATIONS

Office Action issued by the European Patent Office dated Jan. 4, 2023.
Ofice Action issued by the State Intellectual Property Office of China dated Jan. 12, 2023.
German Search Report dated Oct. 8, 2018.
Miscellaneous PCT/EP2019/080375 Documents.

* cited by examiner

MEASUREMENT AND POSITIONING METHODS AND ARRANGEMENTS FOR ASSEMBLING AN ELECTRICAL CABLE

CROSS REFERENCE TO RELATED APPLICATIONS

This US Utility Patent Application is a National Stage application of earlier filed PCT Patent Application No. PCT/EP2019/080375 which was filed on 8 Nov. 2019, and also claims priority to earlier filed German Patent Application No. 10 2018 127 969.8 which was filed on 8 Nov. 2018. Both earlier filed patent applications are titled "Measurement and Positioning Methods and Arrangements for Assembling an Electrical Cable". The aforementioned and identified PCT Patent Application, and the aforementioned and identified German Patent Application are both hereby expressly incorporated herein by this reference in their entireties. Pursuant to USPTO rules, these claims of priority are also set forth in the Application Data Sheet (ADS) filed contemporaneously herewith.

BACKGROUND AND SUMMARY

The invention relates to a measurement method for assembling an electrical cable. The invention also relates to a measurement arrangement for assembling an electrical cable. The invention further relates to a reference device for a measurement arrangement and to a computer program product having program code means for implementing a measurement method.

The invention also relates to a positioning method for assembling an electrical cable. The invention also relates to a positioning arrangement for assembling an electrical cable. The invention further relates to a computer program product having program code means for implementing a positioning method.

Finally, the invention also relates to an assembly method, and an assembly arrangement, for assembling an electrical cable.

During the assembly of electrical cables, the conductors of said cables are typically connected to a plug-type connector. The plug-type connector may be a male connector, a flush male connector, a female connector, a coupler or an adapter. The designation "plug-type connector" used within the scope of the invention is representative of all variants.

A plug-type connector serves the purpose of producing an electrical connection with a correspondingly complementary further plug-type connector.

High demands in respect of robustness and safety of the plug-type connection are placed in particular on plug-type connectors for the automotive industry or for vehicles. Thus, a plug-type connection sometimes needs to withstand high loads, for example mechanical loads or thermal loads, and needs to remain definitively closed so that the electrical connection is not unintentionally disconnected, for example during operation of a vehicle. In particular during (partially) autonomous operation of vehicles and for assistance systems, it is of primary importance to guarantee safety.

Furthermore, the demands on plug-type connectors and cable connections, in particular also inside a vehicle, with respect to the required data rate are meanwhile very high. Sometimes, for example during autonomous operation of a vehicle or when using assistance systems, high volumes of data from a plurality of cameras, various sensors and navigation sources need to be combined with one another and transported, generally in real time. The operation of many appliances, screens and cameras accordingly requires a high-performance infrastructure in the vehicle electronics.

In addition to the mentioned mechanical and electrical demands, it is at the same time important, in order to save space and weight, to design the plug-type connectors to be as compact as possible. When assembling cables and when producing the components of the plug-type connection, the maintenance of the total tolerance ranges required is therefore comparatively demanding.

When assembling a cable, inter alia a supporting sleeve is crimped onto the cable. In addition, an inner conductor contact element (inner conductor part) is crimped onto the inner conductor of the cable. Owing to inaccuracies or tolerances in these fitting steps, the spacing between the male connector-side end of the inner conductor part (i.e. the front, free end of the inner conductor part or that end of the inner conductor part which faces a mating plug-type connector) and a front (male connector-side) end, which faces the inner conductor part, of the supporting sleeve is different between individual prepared cables. In particular owing to the abovementioned high mechanical and electrical demands placed on the plug-type connection, corresponding deviations from an ideal measure need to fall within a predetermined tolerance range in order to ensure a sufficiently high quality of the subsequent plug-type connection.

If appropriate, prepared cables or else already completely assembled cables which deviate from what has been preset should be removed from the production line or from production. The high requirements placed on the plug-type connections can therefore drive up production costs overall in the context of mass production.

The present invention is therefore based on the object of reducing the processing tolerances arising during the assembly of an electrical cable, in particular of avoiding a fluctuating assembly quality.

A measurement method for assembling an electrical cable is provided, in accordance with which an end-side end of a supporting sleeve, which is fastened on the cable, is brought to stop against a reference stop of a reference device.

The supporting sleeve can be brought to stop against the reference stop by virtue of the electrical cable and the reference device being moved relative to one another. The supporting sleeve can therefore be moved in the direction towards the reference stop by virtue of the cable and/or by virtue of the reference device being moved. Preferably, only the electrical cable is moved along a feed direction, while the reference device remains still. In particular, however, a configuration whereby the cable remains still and only the reference device is moved towards the cable is also possible.

According to the invention, an axial spacing between a front, free end of an inner conductor part, which is fastened on an inner conductor of the cable, and the reference stop is detected, and from this a terminal spacing between the front, free end of the inner conductor part and a front end, which faces the inner conductor part, of the supporting sleeve is derived.

If, within the scope of the description or the patent claims, reference is made to the designation "front" (for example "front end"), this directional designation relates to the "male connector-side end" or the "free end" of the prepared electrical cable which faces a mating plug-type connector when the plug-type connection is later closed. In the following figures, the directional designation "front" therefore in each case relates to the left-hand end of the prepared cable. The directional designation "rear" (for example "rear end") correspondingly relates to the cable side which is remote from the male connector-side or free end, i.e. to the "cable-side end" of the prepared electrical cable; in the following figures, therefore, in each case the right-hand side of the prepared cable.

The inner conductor part according to the invention is the inner contact element of the plug-type connector to be fitted on the electrical cable. In principle, within the scope of the invention, provision can also be made for an electrical cable having a plurality of inner conductors, for example, parallel inner conductors to be assembled with a plurality of inner conductor parts. Preferably, the invention nevertheless relates to the assembly of a coaxial cable which only has a single inner conductor which is guided in electrically insulated fashion within an outer conductor, for example within an outer conductor shield.

The terminal spacing which, in accordance with the invention, can be determined or derived for an electrical cable to be assembled is a particularly relevant measure for the fitting of the plug-type connector to the prepared cable. The terminal spacing can, in particular, be relevant in the positioning and fastening of the inner conductor part within an outer conductor part of the subsequent plug-type connector. The outer conductor part can also be referred to as outer conductor contact element or as male connector body. On the basis of the terminal spacing, in addition yet further relevant measures and spacings for the assembly of the electrical cable can be derived.

Within the scope of the invention, a deviation from an ideal measure of the terminal spacing can be determined for each electrical cable to be assembled. The determined deviation can then advantageously be taken into consideration for the subsequent fitting of a plug-type connector or components thereof, for example an outer conductor part. In particular, as a result, an outer conductor part, for example an "outer conductor crimping sleeve" of the plug-type connector, can be positioned axially optimally relative to the supporting sleeve of the prepared cable. The supporting sleeve can be positioned and joined, for example, with a precise fit on an inner shoulder of the outer conductor part.

Owing to the optimal positioning of the plug-type connector or components thereof on the basis of the terminal spacing determined according to the invention, the impedance matching of transitions between the cable and the plug-type connector can be optimized. An air gap which triggers a sudden change in impedance and therefore reflections in the data transmission can be avoided.

On the basis of the determined terminal spacing, therefore, high-accuracy positioning of the components of a plug-type connector relative to one another during the assembly of a cable can be made possible and fluctuating quality in the production can be avoided. As a result, in particular also the electrical properties of the assembled cables, in particular their suitability for high-frequency engineering, can be improved.

Finally, owing to the reduction in faulty products or rejects, the economy of an assembly method for electrical cables can be improved, in particular in the context of mass production.

In addition, it may be possible according to the invention to increase the processing speed in the preparation of an electrical cable since a tolerance measure which may be enlarged by the acceleration of the processing can be compensated for again owing to the determination according to the invention of the terminal spacing and a corresponding positioning of the components of the plug-type connector relative to one another during the assembly of the cable.

In one configuration of the invention, provision can be made for the axial spacing of the front, free end of the inner conductor part to be detected by virtue of a position of the front, free end of the inner conductor part in relation to the origin of a measurement coordinate system being measured and the position of the reference stop within the measurement coordinate system in relation to the origin thereof being taken into consideration.

The measurement coordinate system may preferably be a unidimensional coordinate system whose coordinate axis runs coaxially with respect to a mid-axis of the inner conductor part and which points in the direction of the cable.

The axial spacing can in particular be detected by virtue of the position of the reference stop within the measurement coordinate system being subtracted from the position of the front, free end of the inner conductor part within the measurement coordinate system.

The origin of the measurement coordinate system can be fixed in a defined manner prior to the detection of the position of the front, free end of the inner conductor part and/or determined by a reference calibration.

In a development of the invention, provision can be made for the detected axial spacing between the front, free end of the inner conductor part and the reference stop to correspond to the terminal spacing when the front end of the supporting sleeve is brought to stop against the reference stop during the detection of the axial spacing.

In an alternative development, provision can be made for the terminal spacing to be calculated by virtue of a total length of the supporting sleeve being subtracted from the detected axial spacing between the front, free end of the inner conductor part and the reference stop when a rear end, which is remote from the inner conductor part, of the supporting sleeve is brought to stop against the reference stop during the detection of the axial spacing.

It is therefore possible within the scope of the invention for either the front end, or the rear end, of the supporting sleeve to be brought to stop against the reference stop. Preferably, the front end of the supporting sleeve is brought to stop against the reference stop since this is firstly technically easier to implement for reasons of the infeed and secondly the terminal spacing to be detected can then correspond directly to the detected axial spacing.

In principle, it can nevertheless also be advantageous, depending on the type of prepared cable and other technical conditions, for the reference stop of the reference device to be designed in such a way that the supporting sleeve of the electrical cable stops against the reference stop on the rear side, with its rear end face, for example by virtue of the supporting sleeve first being pushed along a feed direction of the cable axially past the reference stop, the electrical cable and/or the reference device then being shifted orthogonally with respect to the insertion direction, and the electrical cable then being pushed back counter to the feed direction again until the rear end of the supporting sleeve finally stops against the reference stop. The reference stop can in this case protrude in the manner of a web into a cutout in the reference device. For the calculation of the terminal spacing, the total length of the supporting sleeve then needs to be taken into consideration, as has already been described above. Generally, the total length of the supporting sleeve only has a negligible degree of inaccuracy. If appropriate, the total length of the supporting sleeve can nevertheless also be determined, for example measured, in advance.

In a development of the invention, provision can be made for the supporting sleeve to be fastened, preferably crimped, on an outer conductor of the cable.

The fastening of the supporting sleeve on the cable preferably takes place before the supporting sleeve is brought to stop against the reference stop.

In principle, the supporting sleeve can also be fastened, preferably crimped, on a cable sheath of the cable. Fastening of the supporting sleeve partially on the outer conductor of the cable and partially on the cable sheath of the cable can also be provided, for example when the supporting sleeve has a stepped design or a front stop. Preferably, the supporting sleeve is nevertheless fastened on the outer conductor of the cable.

Provision can be made for an outer conductor, which is located beneath the supporting sleeve, of the cable, for example a braided cable shield, to be folded back or turned down rearwards over the supporting sleeve. Turning down of the outer conductor of the cable onto the supporting sleeve can be provided even when the supporting sleeve is not fastened directly on the outer conductor, but on the cable sheath.

If the outer conductor has been folded back over the supporting sleeve, the supporting sleeve, when it is brought to stop against the reference stop, possibly does not bear directly or with the full area against the reference stop. The supporting sleeve therefore may not touch the reference stop when it is stopped against the reference stop. The term "stopped against a reference stop" should therefore be interpreted within the scope of the invention such that an indirect stop of the supporting sleeve against the reference stop is also included, in particular when a turned-back outer conductor is located between the end-side end of the supporting sleeve and the reference stop.

If appropriate, the layer thickness of the outer conductor can be taken into consideration in the determination of the terminal spacing. Thus, for example, the terminal spacing can be calculated by virtue of a layer thickness of the turned-back outer conductor layer being added to the detected axial spacing when the front end of the supporting sleeve is brought to stop against the reference stop during the detection of the axial spacing. Generally, the layer thickness of a turned-back outer conductor can nevertheless be neglected.

The layer thickness of the outer conductor on the front end face of the supporting sleeve can possibly also be taken into consideration in the calculation of the terminal spacing when the supporting sleeve is brought to stop with its rear end against the reference stop. The layer thickness can in this case be subtracted from the detected axial spacing together with the total length of the supporting sleeve.

In a development of the invention provision can be made for the inner conductor part to be inserted axially into a receptacle of the reference device (along a feed direction) until the front end of the supporting sleeve stops against the reference stop.

Alternatively, or in addition, provision can also be made for the reference device to be moved axially with a receptacle over the inner conductor part until the front end of the supporting sleeve bears against the reference stop. As already mentioned above, the movements between the supporting sleeve and the reference device should be understood to be relative within the scope of the invention.

The reference stop can be formed by an end-side face, starting from which the receptacle extends axially into the reference device or can be formed preferably in the receptacle of the reference device by a change in cross section of the receptacle and/or one or more webs protruding into the receptacle.

In a development of the invention, provision can be made for the supporting sleeve to be pressed mechanically against the reference stop.

Pressing of the supporting sleeve against the reference stop may be advantageous for ensuring that the supporting sleeve bears optimally, in particular flat and in planar fashion, against the reference stop, whereafter the terminal spacing can be determinable particularly accurately. In addition, by means of contact pressure, if appropriate a braided cable shield which is turned back over the supporting sleeve can be compressed in such a way that the layer thickness of the braided cable shield, which bears against the end side of the supporting sleeve, can be neglected in the determination of the terminal spacing.

In a development of the invention, provision can be made for the axial spacing between the front, free end of the inner conductor part and the reference stop to be detected by means of a sensor device.

Preferably, the sensor device for this purpose measures the position of the front, free end of the inner conductor part in relation to the origin of the measurement coordinate system. Using the measured position of the front, free end of the inner conductor part, the axial spacing can then be detected by the sensor device taking into consideration the position of the reference stop in relation to the measurement coordinate system.

In an advantageous development, a sensing probe, an inductive sensor, a capacitive sensor and/or en optical sensor is used as sensor device.

Preferably, a sensing probe is used which detects the axial spacing between the front, free end of the inner conductor part and the reference stop by direct mechanical contact with said front, free end. A sensing probe can be particularly well suited owing to the high accuracy of the mechanical, direct measurement of the axial spacing.

Nevertheless, contactless detection of the position of the front end of the inner conductor part relative to the reference stop can also be advantageous, for example by means of an inductive sensor or a capacitive sensor. An optical sensor can also be provided for detecting the axial spacing, for example the detection of the position of the front, free end of the inner conductor part by means of a camera.

When using a camera for detecting the axial spacing, it may be advantageous to take care that the edge formed by the front end of the supporting sleeve is easily recognizable by the camera. Alternatively, it is also possible for only that position of the front, free end of the inner conductor part which is located at a defined spacing from the supporting sleeve to be detected by means of the camera, as a result of which it is possible to conclude indirectly on the axial spacing.

In a development of the invention, provision can be made for the sensor device to be brought to stop against a measurement stop of the reference device, wherein the measurement stop and the reference stop are arranged at mutually remote ends of a through-bore, which extends axially through the reference device.

The use of a measurement stop for detecting the axial spacing between the front, free end of the inner conductor part and the reference stop may be advantageous since the measurement stop can be arranged opposite the reference stop with a known axial spacing. By taking into consideration the known spacing, the axial spacing can finally be calculated by detecting the position of the front, free end of the inner conductor part.

The position of the reference stop can be used for establishing the origin of the measurement coordinate system. For example, the position of the reference stop can correspond to the origin of the measurement coordinate system.

Therefore, the present position of the prepared cable or the inner conductor part thereof in the outer conductor part is determined by means of the sensor device. In this case, in particular a previously determined deviation of a terminal spacing between the front, free end of the inner conductor part and a front end, which faces the inner conductor part, of the supporting sleeve can be taken into consideration.

It may be of particular advantage if the reference stop and the measurement stop are arranged coaxially or aligned with respect to one another.

In one configuration of the invention, the reference device can be in the form of a multi-part frame structure, wherein the reference stop is in the form of a stop ring, for example, and is fixed in a defined position in the frame structure. In this case, the optional measurement stop can preferably likewise be in the form of a stop ring and can be arranged in the frame structure in such a way that the two stop rings are opposite one another, in particular are arranged coaxially with respect to one another. A through-bore between the reference stop and the measurement stop is thus therefore not absolutely necessary.

In a development, provision can be made for the sensor device to be pressed mechanically against the measurement stop or to be fixed on the measurement stop. Provision may also be made for the sensor device to have a housing section which is formed integrally with the reference device.

In particular, positioning and fixing of the sensor device in a known position relative to the measurement stop can be advantageous. This is particularly (but not exclusively) the case when the sensor device is brought to stop against the measurement stop.

Fixing of the sensor device on the measurement stop can take place, for example, by means of a screwed joint, snap-action joint or bayonet joint. It is also possible for a threaded joint to be provided.

In a development of the invention, provision can also be made for the supporting sleeve of a reference cable, which has a setpoint terminal spacing, to be brought to stop against the reference stop, whereafter the sensor device is positioned and/or calibrated using the axial spacing between the front, free end of the inner conductor part of the reference cable and the reference stop.

Positioning of the sensor device can take place by the position of the front, free end of the inner conductor part of the reference cable to the extent that the sensor device is still able to detect tolerance-related discrepancies in the position of the front, free end of the inner conductor part for the individual cables to be assembled. Calibration of the sensor device can take place to the extent that the position of the front, free end of the inner conductor part of the reference cable is defined as zero measure or reference/zero position.

For example, a sensor device in the form of a sensing probe can be positioned relative to the front end of the inner conductor part of the reference cable in such a way that a movable sensing tip of the sensing probe is located in a mid-position during the measurement of the reference cable, in which mid-position the sensing tip has sufficient positive and negative travel available to be able to detect discrepancies, which are to be expected owing to tolerances, in the terminal spacing of the individual electrical cables to be assembled.

The position of the front, free end of the reference cable can be used for determining the origin of the measurement coordinate system. For example, the position of the front, free end of the reference cable can correspond to the origin of the measurement coordinate system when the reference cable is stopped against the reference stop.

In a development, provision can be made for a deviation of the terminal spacing of the cable to the assembled from the setpoint terminal spacing of the reference cable to be determined by means of the sensor device.

A deviation can be determined in particular on the basis of the previously calibrated sensor device taking into consideration a zero measure or a reference position of the reference cable.

In particular, when using a sensor &vice in the form of a sensing probe, the detection of a deviation of the terminal spacing of the cable to be assembled from a setpoint terminal spacing can be determined reliably.

Depending on this (stored ideal terminal spacing, the deviations of the individual prepared cables can then be determined by means of the measurement method or a measurement arrangement.

A deviation of the axial spacing from an ideal measure can in principle be determined even without the use of a reference cable, for example when the sensor device (for example the sensing probe) is brought into a known relative position in relation to the reference stop, preferably is brought to stop against the measurement stop of the reference device. Owing to the constant and known spacing between the measurement stop and the reference stop and a known reference or ideal terminal spacing, the sensor device can therefore directly determine a deviation for each cable to the measured.

The invention also relates to a measurement arrangement for assembling an electrical cable. The measurement arrangement has a reference device having a reference stop. The measurement arrangement also has an infeed device, which is designed to bring an end-side end of a supporting sleeve, which is fastened on the cable, to stop against the reference stop.

The infeed device can be designed to bring the end-side end of the supporting sleeve to stop against the reference stop by virtue of the infeed device moving the electrical cable along a feed direction and/or by virtue of the infeed device moving the reference device. Within the scope of the invention, it is in principle only a matter of a relative movement between the supporting sleeve and the reference device. Preferably, the infeed device nevertheless moves or shifts the electrical cable axially along a feed direction towards the reference stop while the reference stop or the reference device remains still.

According to the invention, the measurement arrangement further has a sensor device, which is designed to detect an axial spacing between a front, free end of an inner conductor part, which is fastened on an inner conductor of the cable, and the reference stop.

In accordance with the invention, it is possible by means of the proposed measurement arrangement to determine particularly relevant measures of an already prepared (for example provided with a supporting sleeve and an inner conductor part and stripped of insulation for the further processing steps) electrical cable in order to be able to engage in subsequent process steps. By means of the measurement arrangement, it is possible in principle for each electrical cable to be processed to be checked and/or measured.

The measurement method can be incorporated in a simple manner in process steps during the assembly of an electrical cable, in particular since the proposed measurement principle enables the detection of the terminal spacing in a comparatively short time.

In one configuration of the invention, provision may be made in particular for the sensor device to be designed to detect the axial spacing of the front, free end of the inner conductor part by virtue of the position of the front, free end of the inner conductor part in relation to the origin of the measurement coordinate system being measured and the position of the reference stop within the measurement coordinate system in relation to the origin thereof being taken into consideration.

The sensor device can in particular be designed to detect the axial spacing by virtue of the position of the reference stop within the measurement coordinate system being subtracted from the position of the front, free end of the inner conductor part within the measurement coordinate system.

In a development, provision can be made in particular for an open-loop control device of the measurement arrangement to be set up to derive a terminal spacing between the front, free end of the inner conductor part and a front end, which faces the inner conductor part, of the supporting sleeve from the detected axial spacing of the front, free end of the inner conductor part.

The terminal spacing is, as has already been mentioned, a particularly important measure in the assembly of an electrical cable whose processing tolerances can now be monitored according to the invention and can be compensated for in subsequent process steps.

Owing to the measurement technology provided by means of the measurement arrangement and taking into consideration the detected terminal spacing and possibly further measures derived herefrom, a machine-assembled electrical cable can be produced with a high and consistent quality and ultimately used for transmitting data with high data rates, in particular in high-frequency engineering.

In a development of the invention, provision can be made for the reference device to have a receptacle for the inner conductor part of the cable.

If the reference device has a receptacle for the inner conductor part of the cable, the supporting sleeve of the cable can be brought to stop against the reference stop particularly easily by virtue of the electrical cable being inserted axially along a feed direction into the receptacle of the reference device by means of the infeed device.

A reference stop can nevertheless also advantageously be provided without a receptacle in the reference device, for example by an arrangement of the reference stop on a frame structure.

In a development of the invention, provision can further be made for the reference device to have a measurement stop, wherein the measurement stop and the reference stop are arranged at mutually remote ends of a through-bore, which extends axially through the reference device, or in the region of the mutually remote ends of the through-bore.

The measurement stop and/or the reference stop can be formed on the end-side faces of the reference device between which the through-bore extends. The measurement stop and/or the reference stop can nevertheless also be formed on changes in cross section in the through-bore. Alternative possibilities for forming the reference stop and/or the measurement stop are also possible, for example by means of in each case one or more webs, which extend into the interior of the through-bore. The reference stop and/or the measurement stop can also be formed independently of a through-bore, for example by stamping on a frame structure of the reference device.

In a development, provision can be made for the sensor device to be fixed on the measurement stop or for the sensor device to have a housing section which is formed integrally with the reference device.

A housing, or the housing section, of the sensor device can be formed, for example, as an integral injection-molded part together with the reference device.

Fixing of the sensor device on the measurement stop can take place, for example, by means of a screwed joint, snap-action joint or bayonet joint. A threaded joint may also be provided.

The sensor device can also be fixed on, or pressed against, the measurement stop in a force-fitting manner by means of an actuator device.

In particular, it may be advantageous to position and possibly fix the sensor device in a defined manner relative to the measurement stop since then the relationship or the spacing between the measurement stop (or at least the sensor device) and the reference stop is known and therefore the axial spacing between the front, free end of the inner conductor part and the reference stop can be derived easily.

In a development of the invention, provision can be made for the sensor device to have a sensing probe, an inductive sensor, a capacitive sensor and/or an optical sensor.

The sensor device can also be formed on the basis of other technologies. Preferably, the sensor device is in the form of a sensing probe in order to detect the position of the front end of the inner conductor part by direct mechanical contact with a high degree of accuracy.

The invention also relates to a reference device having a reference stop for a measurement arrangement as described herein.

In addition, the invention relates to the advantageous use of a reference device having a reference stop with the measurement method described herein.

The invention also relates to a computer program product having program code means for implementing a measurement method as described herein for assembling an electrical cable when the program is executed on an open-loop control device of a measurement arrangement in accordance with the embodiments described herein.

The open-loop control device can preferably be in the form of a programmable logic controller (PLC). Instead of a PLC, nevertheless any other desired device for implementing the open-loop control device can also be provided, for example any desired microprocessor, one or more arrangements of discrete electrical components on a printed circuit board, an application-specific integrated circuit (ASIC) or another programmable circuit, for example also a field programmable gate array (FPGA), a programmable logic array (PLA) and/or a conventional computer.

Within the scope of the united overall inventive concept for achieving the object, the invention further relates to, in addition to the proposed measurement concept, comprising the measurement method, the measurement arrangement, the reference device and the computer program product for implementing the measurement method, a positioning concept, comprising a positioning method, a positioning arrangement and a computer program product for implementing the positioning method.

The invention therefore also relates to a positioning method for assembling an electrical cable, in accordance with which a front, free end of an inner conductor part, which is fastened on an inner conductor of the cable, is positioned by means of an infeed movement in an outer conductor part, which is to be fitted on the cable, in an axial setpoint position along a longitudinal axis of the outer conductor part.

As regards the infeed movement, this is merely a relative movement of the inner conductor part in relation to the outer conductor part. The inner conductor part can be positioned in the outer conductor part by means of an infeed movement of the electrical cable along a feed direction and/or the outer conductor part can be pushed over the inner conductor part of the electrical cable by means of the infeed movement. Preferably, an infeed movement of the cable is performed, while the outer conductor part is fixed.

If, within the scope of the description, or the patent claims, reference is made to the designation "front" (for example "front end"), this directional designation relates to the "male connector-side end" or the "free end" of the prepared electrical cable which faces a mating plug-type connector when the plug-type connection is later closed. In the following figures, the directional designation "front" therefore in each case relates to the left-hand end of the prepared cable. The directional designation "rear" (for example "rear end") correspondingly relates to the cable side which is remote from the male connector-side, or free end, i.e. to the "cable-side end" of the prepared electrical cable; in the following figures, therefore, in each case the right-hand side of the prepared cable.

The inner conductor part according to the invention is the inner contact element of the plug-type connector to be fitted on the electrical cable. In principle, within the scope of the invention, provision can also be made for the electrical cable to be assembled with a plurality of inner conductor parts, for example parallel inner conductor parts. Preferably, the invention nevertheless relates to the assembly of a coaxial cable which only has a single inner conductor which is guided in electrically insulated fashion within an outer conductor, for example within an outer conductor shield.

The outer conductor part according to the invention is the outer contact element of the plug-type connector to be fitted on the electrical cable, generally an outer conductor crimping sleeve. The outer conductor part can also be referred to as outer conductor contact element or as male connector body. The outer conductor part is generally fitted in such a way that it accommodates the inner conductor part completely in it and, for example, electromagnetically shields it.

In practice, for stabilization and ensuring electrical insulation between the at least one inner conductor part and the outer conductor part, an insulating body can be provided between the outer conductor part and the inner conductor part, which insulating body extends at least sectionally over, and axially between the inner conductor part and the outer conductor part.

In order to ensure suitable electrical and/or mechanical properties, an axial setpoint position of the inner conductor part for fastening in the outer conductor part is provided.

According to the invention, the proposed positioning method provides that the setpoint position is calculated taking into consideration a terminal spacing between the front end of the inner conductor part and a front end, which faces the inner conductor part, of a supporting sleeve, which is fastened on the cable. During the infeed movement, an axial actual position of the front end of the inner conductor part relative to the outer conductor part is measured.

The terminal spacing is generally a particularly relevant and also tolerance-related measure in the assembly of an electrical cable. Taking the terminal spacing into consideration for determining the setpoint position of the front end of the inner conductor part in the outer conductor part makes it possible, according to the invention, to produce assembled electrical cables or electrical cables provided with a plug-type connector with the highest quality and whilst avoiding fluctuating electrical and/or mechanical properties.

The terminal spacing can be ensured, for example, on the basis of a previous, high-accuracy preparation of the electrical cable. The terminal spacing can nevertheless preferably also be determined on the basis of the measurement concept proposed within the scope of the overall inventive concept, for example by means of the measurement method described above and below. The terminal spacing can, however, also be determined in another way or may be known. The proposed positioning method can therefore in principle also be usable independently of the described measurement concept.

In a development of the invention, provision can be made for the setpoint position to be calculated on the basis of an axial ideal position of the supporting sleeve in the outer conductor part for subsequent fastening of the outer conductor part on the supporting sleeve.

In order to ensure advantageous mechanical and/or electrical properties of an assembled electrical cable or an electrical cable provided with a plug-type connector, in particular the correct positioning of the supporting sleeve in the outer conductor part is an important criterion. Preferably, the supporting sleeve is located in the intended ideal position within the outer conductor part during the fastening, in particular during the crimping of the outer conductor part. Since, starting from the front end, which faces the inner conductor part, of the supporting sleeve, the terminal spacing extends up to the front, free end of the inner conductor part, it is possible to conclude on the ideal position of the supporting sleeve in the outer conductor part when the terminal spacing, starting from the front end of the inner conductor part, is known or is at least sufficiently accurately known. For this reason, within the scope of the invention the setpoint position of the front end of the inner conductor part can be determined in an advantageous manner in such a way that, taking into consideration the terminal spacing, the supporting sleeve is located in the ideal position precisely when the front, free end of the inner conductor part is located in the calculated setpoint position.

In a similar way, within the scope of the invention ideal positions of other sections of the prepared electrical cable within the outer conductor part can also be used for the calculation of the setpoint position.

Positioning of the inner conductor part in the outer conductor part can take place particularly accurately and easily taking into consideration the actual position of the front end of the inner conductor part since the inner conductor part is the front, terminating end of the prepared electrical cable whose position can therefore be determined technically easily. A complex direct determination, for example of the ideal position of the supporting sleeve in the outer conductor part, can therefore be avoided.

In a development of the invention, provision can be made for the axial ideal position of the supporting sleeve in the outer conductor part to be determined corresponding to the position of the front end of the supporting sleeve on an inner shoulder of the outer conductor part.

The ideal alignment of the supporting sleeve on the inner shoulder of the outer conductor part, in particular for minimizing an air gap between the shoulder and the supporting sleeve in the case of a fastened or crimped outer conductor part, can improve the electrical properties of the assembled electrical cable. Owing to the avoidance of an air gap, discontinuities in the impedance characteristic are minimized. Targeted impedance matching at the transition between the electrical cable and a plug-type connector can also be realized by influencing the air gap.

In principle, however, another ideal position of the supporting sleeve in the outer conductor part may also be desired.

In a development of the invention, provision can be made for the cable to be clamped in a gripping device, whereafter the gripping device is shifted linearly along the longitudinal axis of the outer conductor part and/or whereafter the outer conductor part is shifted linearly along the longitudinal axis of the outer conductor part in order to position the inner conductor part in the outer conductor part.

The gripping device can in particular have one or more press jaws. The gripping device grips the cable preferably on the cable sheath thereof.

As already mentioned, provision can nevertheless also be made for only, or else additionally, the outer conductor part to be shifted in order to position the inner conductor part in it. In this case, it is also possible for a gripping device to be provided, which clamps the cable, then nevertheless fixes it substantially in the same axial position.

In a development of the invention, provision can also be made for the axial actual position of the front end of the inner conductor part relative to the outer conductor part to be measured by means of a sensor device.

In a development of the invention, in particular a sensing probe, an inductive sensor, a capacitive sensor and/or an optical sensor can be used as sensor device.

Preferably, a sensing probe is used which, by means of direct mechanical contact with the front, free end of the inner conductor part, detects the axial spacing between said front, free end and the reference stop. A sensing probe can be particularly well suited owing to the high accuracy of the direct mechanical measurement of the axial spacing.

Nevertheless, contactless detection of the position of the front end of the inner conductor part relative to the reference stop can also be advantageous, for example by means of an inductive sensor or a capacitive sensor. It is also possible for an optical sensor to be provided for detecting the axial spacing, for example the detection of the position of the front, free end of the inner conductor part by means of a camera.

In an advantageous development of the invention, provision can be made for the sensor device to be positioned and fixed in a defined manner relative to the outer conductor part.

For example, the sensor device can be stopped against a front end of the outer conductor part and fixed in a force-fitting and/or form-fitting manner. The sensor device can be pushed over a front section of the outer conductor part in order to assist the fixing or can at least partially penetrate a front section of the outer conductor part. The sensor device can latch with the outer conductor part, if appropriate, for example using latching means, receptacles for latching means or steps which are present in any case in the outer conductor part for fitting thereof in a plug-type connector housing.

In principle, the sensor device nevertheless does not need to be fixed on the outer conductor part. In particular, the sensor device can also be arranged in a known position relative to the outer conductor part.

In a development, provision can be made for a setpoint position for a reference cable to be determined whilst taking into consideration the ideal position of the reference cable in the outer conductor part, wherein the sensor device is positioned and fixed in a defined manner on the basis of the setpoint position of the reference cable in order to measure the actual position of the cable to be assembled at least in a front section of the outer conductor part.

In this case, the sensor device is preferably fixed on the outer conductor part; however, this is not absolutely necessary. Fixing of the sensor device in a known position relative to the outer conductor part can likewise be sufficient.

The front section of the outer conductor part can be, for example, the front half of the outer conductor part, the front third of the outer conductor part, the front quarter of the outer conductor part, the front eighth of the outer conductor part, the front sixteenth of the outer conductor part or an even shorter front section of the outer conductor part, in each case based on the axial total length of the outer conductor part.

Positioning of the sensor device can take place by taking into consideration the ideal position of the reference cable to the extent that the sensor device is still able to detect tolerance-related discrepancies in the position of the front, free end of the inner conductor part for the individual cables to be assembled during the positioning. Calibration of the sensor device can take place to the extent that the position of the front, free end of the inner conductor part of the reference cable in the outer conductor part is defined as zero measure or reference zero position.

For example, a sensor device in the form of a sensing probe can be positioned relative to the front end of the inner conductor part of the reference cable in such a way that a movable sensing tip of the sensing probe is located in a mid-position during the measurement of the reference cable, in which mid-position the sensing tip has sufficient positive and negative travel available to be able to detect discrepancies, which are to be expected owing to tolerances, in the terminal spacing of the individual electrical cables to be assembled.

In a development of the invention, provision can be made for the actual position to be measured continuously or time-discretely (in a time frame) during the infeed at least in a front section of the outer conductor part.

Therefore, the measurement of the actual position can take place throughout the infeed movement of the inner conductor part into the outer conductor part or preferably only in a front section of the outer conductor part and therefore also only shortly before the setpoint position of the inner conductor part in the outer conductor part is reached.

In addition to the continuous or time-discrete measurement, provision can also be made for only a single measurement to take place, whereafter first the actual reaching of the setpoint position or the crossing of a measurement position shortly before the setpoint position is detected. For example, provision can be made for the reaching of the setpoint position to be detected by stopping of the front end of the inner conductor part against a sensing tip of a sensing probe.

In a development of the invention, provision can be made for the inner conductor part to be positioned in the outer conductor part taking into consideration the measured actual position as part of a closed-loop position control.

The continuously or time-discretely measured actual positions can therefore be made available to a transport device entrusted with the infeed movement for closed-loop control of the infeed movement.

As part of an automatic closed-loop position control, therefore a measured discrepancy in the actual position from the setpoint position can therefore be signaled continuously or in a specific time frame by the sensor device, possibly with a monitoring unit interposed, to the transport device.

The invention also relates to a positioning arrangement for assembling an electrical cable, having a transport device, which is designed to position a front, free end of an inner conductor part, which is fastened on an inner conductor of the cable, by means of an infeed movement in an outer conductor part, which is to be fitted on the cable, in an axial setpoint position along a longitudinal axis of the outer conductor part.

The transport device can be designed to feed the inner conductor part into the outer conductor part by means of the movement of the electrical cable and/or to move the outer conductor part over the inner conductor part. Within the scope of the invention, it is merely a matter of a relative movement of the inner conductor part in relation to the outer conductor part. Preferably, the transport device is designed and set up to feed the electrical cable axially along a feed direction in order to insert the inner conductor part into the outer conductor part while the outer conductor part remains still.

According to the invention, the positioning arrangement has a sensor device, which is set up to measure an axial actual position of the front end of the inner conductor part relative to the outer conductor part during the infeed. In addition, the positioning device has an open-loop and/or closed-loop control device, which is set up to calculate the setpoint position taking into consideration the measurement of the actual position of the front end of the inner conductor part and taking into consideration a terminal spacing between the front end of the inner conductor part and a front end, which faces the inner conductor part, of a supporting sleeve, which is fastened on the cable, and to position in the setpoint position by means of the transport device.

As part of the assembly of electrical cables, during the fitting of a plug-type connector on the electrical cable, various length measures and spacing measures can be provided for adhering to tolerances and for ensuring sufficiently good mechanical and/or electrical properties of the plug-type connector, which is fastened on the cable. The positioning arrangement according, to the invention is able to ensure the adherence of mentioned specifications.

According to the invention, an advantageous closed-loop process control can be provided and processing tolerances can be compensated for by the process monitoring.

In a development of the invention, provision can be made for the sensor device to have a sensing probe, an inductive sensor, a capacitive sensor and/or an optical sensor.

The sensor device can also be designed on the basis of other technologies. Preferably, the sensor device is in the form of a sensing probe in order to detect the position of the front end of the inner conductor part with high accuracy by means of direct mechanical contact.

In a development of the invention, the sensor device is preferably positioned and arranged fixedly in a defined manner relative to the outer conductor part.

The sensor device can also be fixed on the outer conductor part or pressed against the outer conductor part in a force-fitting manner by means of an actuator device.

In particular, it may be advantageous to position and possibly fix the sensor device in a defined manner relative to the outer conductor part since then the relationship or the spacing between the sensor device and the outer conductor part is known and therefore the axial actual position and the setpoint position of the front, free end of the inner conductor part relative to the front end of the outer conductor part can be derived easily.

The invention also relates to a computer program product having program code means for implementing the positioning method described herein when the program is executed on a closed-loop and/or open-loop control device of a positioning arrangement in accordance with the embodiments described herein.

The closed-loop and/or open-loop control device can preferably be in the form of a programmable logic controller (PLC). Instead of a PLC, nevertheless any other desired device for implementing the closed-loop and/or open-loop control device can also be provided, for example any desired microprocessor, one or more arrangements of discrete electrical components on a printed circuit board, an application-specific integrated circuit (ASIC) or another programmable circuit, for example also a field programmable gate array (FPGA), a programmable logic array (PLA) and/or a conventional computer.

Finally, the overall inventive concept for achieving the objects also relates to an assembly method for assembling an electrical cable, wherein a measurement method in accordance with the embodiments disclosed herein is implemented, whereafter a positioning method in accordance with the embodiments disclosed herein is implemented, and whereafter the supporting sleeve is fastened in the outer conductor part.

The basic concept of the assembly method according to the invention consists in determining a measure which is critical for the assembly, in particular a terminal spacing between a front, free end of the inner conductor and a front end, which faces the inner conductor part, of the supporting sleeve by means of a measurement method and then taking this measure into consideration as part of a positioning method of the cable for positioning the inner conductor part of the cable in an outer conductor part of the subsequent plug-type connector.

In this way, the outer conductor part of the plug-type connector can be positioned axially optimally relative to the inner conductor part and/or relative to a supporting sleeve fastened on the cable.

The measurement concept according to the invention and the positioning concept according to the invention can nevertheless also be implemented independently of one another.

Inaccurate positioning of an inner conductor part or of a prepared electrical cable within an outer conductor part or overall within a plug-type connector and possibly a fluctuating quality, in particular fluctuating high-frequency performance, of plug-type connectors can be avoided in accordance with the invention.

The proposed assembly method can also have further method steps. In particular, provision can be made for the electrical cable to already be prepared prior to the implementation of the measurement method.

As part of a preparation in particular, provision can be made for a cable sheath of the cable to be stripped of insulation at a front section of the cable and to be at least partially withdrawn from the cable. Then, the supporting sleeve can be pushed onto the exposed outer conductor, in particular a braided cable shield and/or onto the cable sheath and fastened, in particular crimped. In turn, then the outer conductor of the cable, in particular a braided cable shield, can be folded back rearwards over the supporting sleeve or detached starting from the supporting sleeve. Then, a cable film which may be present can be at least sectionally detached. In turn, then a dielectric arranged between the outer conductor of the cable and the at least one inner conductor of the cable can have the insulation stripped from it and therefore the at least one inner conductor of the cable can be exposed. Finally, an inner conductor part can be fastened, in particular crimped, on each existing inner conductor of the cable.

The fastening of the supporting sleeve in the outer conductor part preferably takes place by crimping the outer conductor part on the supporting sleeve and/or on the cable sheath.

As part of the assembly method, once the outer conductor part has been fastened, provision can be made for the outer conductor part to be fitted in a housing of a plug-type connector, in particular to be latched and secured in a plastic housing. Prior to this or subsequently, provision can also be made for an insulating part to be inserted between the outer conductor part and the at least one inner conductor part in order to ensure the electrical insulation and the alignment of the at least one inner conductor part in the outer conductor part.

The overall inventive concept finally also relates to an assembly arrangement for assembling an electrical cable, having a measurement arrangement as described herein and a positioning arrangement in accordance with the embodiments disclosed herein.

The assembly arrangement can optionally also have yet further apparatus features, for example apparatuses for preparing the cable, in particular for fitting the supporting sleeve and for stripping off the insulation from cable components.

An assembly machine or assembly arrangement according to the invention can provide assembly of electrical cables with plug-type connectors in particular with a consistent, high quality.

The invention, i.e. the described measurement concept, the positioning concept, the assembly method and the assembly arrangement, is not restricted to a specific type of plug-type connector or to a specific plug-type connector, wherein the invention is in particular suited to the assembly of electrical cables with plug-type connectors for high-frequency engineering. A corresponding plug-type connector can therefore preferably be in the form of a high-frequency plug-type connector, in particular, but not limited to, in the form of a PL plug-type connector, BNC plug-type connector, TNC plug-type connector, SMBA (FAKRA) plug-type connector, N plug-type connector, 7-16 plug-type connector, SMA plug-type connector, SMB plug-type connector, SMS plug-type connector, SMC plug-type connector, SMP plug-type connector, BMS plug-type connector, HFM plug-type connector, NSD plug-type connector, H-MTD plug-type connector, BMK plug-type connector, Mini-Coax plug-type connector or Makax plug-type connector.

The plug-type connector according to the invention can particularly advantageously be used within a vehicle, in particular a motor vehicle. Possible, and contemplated, use areas are autonomous driving, driver assistance systems, navigation systems, "infotainment" systems, rear entertainment systems, Internet links and Wireless Gigabit (IEEE 802.11ad Standard). Possible, and contemplated, applications are high-resolution cameras, for example 4K and 8K cameras, sensor systems, onboard computers, high-resolution screens, high-resolution instrument panels, 3D navigation devices, and mobile radio devices.

The plug-type connector according to the invention or the electrical cable according to the invention is nevertheless suitable for any desired applications throughout electrical engineering and is not to be considered as being restricted to use in automotive engineering.

Features which have been described in connection with the measurement method, the measurement arrangement, the reference device, the positioning method, the positioning arrangement, the assembly method, the assembly arrangement and one of the computer program products are in each case interchangeable with one another if this is not ruled out technically. For example, features which have been described in connection with the measurement method according to the invention and with the measurement arrangement according to the invention can also be applicable for the positioning method according to the invention and for the positioning arrangement according to the invention, respectively, and vice versa.

In addition, advantages which have been described in connection with the measurement method, the measurement arrangement, the reference device, the positioning method, the positioning arrangement, the assembly method, the assembly arrangement and one of the computer program products may also be advantageous for the respective other subjects.

In addition, reference is made to the fact that terms such as "comprising", "have", "with" or "having" do not rule out any other features or steps. Also, terms such as "a", "an" or "the" which indicate the singular for steps or features do not rule out a plurality of features or steps, and vice versa.

Exemplary embodiments of the invention will be described in more detail below with reference to the accompanying Figures.

The Figures each show preferred exemplary embodiments in which individual features of the present invention are illustrated in combination with one another. Features of an exemplary embodiment can also be realized separately from the other features of the same exemplary embodiment and can correspondingly be combined easily with features of other exemplary embodiments by a person skilled in the art to give further sensible combinations and sub-combinations.

SUMMARY

A principal aspect of the invention is a measurement method for assembling an electrical cable, in accordance with which an end-side end of a supporting sleeve, which is fastened on the cable, is brought to stop against a reference stop of a reference device, whereafter an axial spacing between a front, free end of an inner conductor part, which is fastened on an inner conductor of the cable, and the reference stop is detected, and from this a terminal spacing between the front, free end of the inner conductor part and a front end, which faces the inner conductor part, of the supporting sleeve is derived.

A further aspect of the present invention is a measurement method, characterized in that the detected axial spacing ($a_1$) corresponds to the terminal spacing (y) when the front end of the supporting sleeve is brought to stop against the reference stop during the detection of the axial spacing ($a_1$).

A further aspect of the present invention is a measurement method characterized in that the inner conductor part is inserted axially into a receptacle of the reference device until the front end of the supporting sleeve stops against the reference stop.

A further aspect of the present invention is a measurement method characterized in that the terminal spacing (y) is calculated by virtue of a total length (L) of the supporting sleeve being subtracted from the detected axial spacing ($a_2$) when a rear end, which is remote from the inner conductor part, of the supporting sleeve is brought to stop against the reference stop during the detection of the axial spacing ($a_2$).

A further aspect of the present invention is a measurement method characterized in that the supporting sleeve is fastened, preferably crimped, on an outer conductor of the electrical cable.

A further aspect of the present invention is a measurement method characterized in that the supporting sleeve is pressed mechanically against the reference stop.

A further aspect of the present invention is a measurement method characterized in that the axial spacing ($a_1$, $a_2$) between the front, free end of the inner conductor part and the reference stop is detected by means of a sensor device.

A further aspect of the present invention is a measurement method characterized in that a sensing probe, an inductive sensor, a capacitive sensor and/or an optical sensor is used as sensor device.

A further aspect of the present invention is a measurement method characterized in that the sensor device is brought to stop against a measurement stop of the reference device, wherein the measurement stop and the reference stop are arranged at mutually remote ends of a through-bore, which extends axially through the reference device.

A further aspect of the present invention is a measurement method characterized in that the sensor device is pressed mechanically against the measurement stop or fixed on the measurement stop.

A further aspect of the present invention is a measurement method characterized in that the supporting sleeve of a reference cable, which has a setpoint terminal spacing, is brought to stop against the reference stop, whereafter the sensor device is positioned and/or calibrated using the axial spacing between the front, free end of the inner conductor part of the reference cable and the reference stop.

A further aspect of the present invention is a measurement method characterized in that a deviation of the terminal spacing (y) of the cable to be assembled from the setpoint terminal spacing of the reference cable is determined by means of the sensor device.

A further aspect of the present invention is a measurement arrangement for assembling an electrical cable, having a reference device having a reference stop, an infeed device, which is designed to bring an end-side end of a supporting sleeve, which is fastened on the cable, to stop against the reference stop, a sensor device, which is designed to detect an axial spacing ($a_1$, $a_2$) between a front, free end of an inner conductor part, which is fastened on en inner conductor of the cable, and the reference stop.

A further aspect of the present invention is a measurement arrangement, characterized in that an open-loop control device is provided and is set up to derive a terminal spacing (y) between the front, free end of the inner conductor part and a front end, which faces the inner conductor part, of the supporting sleeve from the detected axial spacing ($a_1$, $a_2$) of the front, free end of the inner conductor part.

A further aspect of the present invention is a measurement arrangement characterized in that the reference device has a receptacle for the inner conductor part of the cable.

A further aspect of the present invention is a measurement arrangement characterized in that the reference device has a measurement stop, wherein the measurement stop and the reference stop are arranged at mutually remote ends of a through-bore, which extends axially through the reference device, or in the region of the mutually remote ends of the through-bore.

A further aspect of the present invention is a measurement arrangement characterized in that the sensor device is fixed on the measurement stop, or in that the sensor device has a housing section which is formed integrally with the reference device.

A further aspect of the present invention is a measurement arrangement characterized in that the sensor device has a sensing probe, an inductive sensor, a capacitive sensor and/or an optical sensor.

A further aspect of the present invention is a reference device having a reference stop for a measurement arrangement A further aspect of the present invention is a computer program product having program code means for implementing a measurement method when the program is executed on an open-loop control device of a measurement arrangement.

A further aspect of the present invention is a positioning method for assembling an electrical cable, in accordance with which a front, free end of an inner conductor part, which is fastened on an inner conductor of the cable, is positioned by means of an infeed movement in an outer conductor part, which is to be fitted on the cable, in an axial setpoint position ($P_{SET}$) along a longitudinal axis (A) of the outer conductor part, characterized in that the setpoint position ($P_{SET}$) is calculated taking into consideration a terminal spacing (y) between the front end of the inner conductor part and a front end, which faces the inner conductor part, of a supporting sleeve, which is fastened on the cable, wherein, during the infeed movement, an axial actual position ($P_{ACT}$) of the front end of the inner conductor part relative to the outer conductor part is measured.

A further aspect of the present invention is a positioning method characterized in that the setpoint position ($P_{SET}$) is calculated on the basis of an axial ideal position ($P_{IDEAL}$) of the supporting sleeve in the outer conductor part for subsequent fastening of the outer conductor part on the supporting sleeve.

A further aspect of the present invention is a positioning method characterized in that the axial ideal position ($P_{IDEAL}$) of the supporting sleeve in the outer conductor part is determined corresponding to the position of the front end of the supporting sleeve on an inner shoulder of the outer conductor part.

A further aspect of the present invention is a positioning method characterized in that the cable is clamped in a gripping device, whereafter the gripping device is shifted linearly along the longitudinal axis (A) of the outer conductor part and/or whereafter the outer conductor part is shifted linearly along the longitudinal axis (A) of the outer conductor part in order to position the inner conductor part in the outer conductor part.

A further aspect of the present invention is a positioning method characterized in that the axial actual position ($P_{ACT}$) of the front end of the inner conductor part relative to the outer conductor part is measured by means of a sensor device.

A further aspect of the present invention is a positioning method characterized in that a sensing probe, an inductive sensor, a capacitive sensor and/or an optical sensor is used as sensor device.

A further aspect of the present invention is a positioning method characterized in that the sensor device is positioned and fixed in a defined manner relative to the outer conductor part.

A further aspect of the present invention is a positioning method characterized in that a setpoint position for a reference cable is determined taking into consideration the ideal position of the reference cable in the outer conductor part, wherein the sensor device is positioned and fixed in a defined manner on the basis of the setpoint position of the reference cable in order to measure the actual position ($P_{ACT}$) of the electrical cable to be assembled at least in a front section of the outer conductor part.

A further aspect of the present invention is a positioning method characterized in that the actual position ($P_{ACT}$) is measured continuously or time-discretely during the infeed at least in a front section of the outer conductor part.

A further aspect of the present invention is a positioning method characterized in that the inner conductor part is positioned in the outer conductor part taking into consideration the measured actual position ($P_{ACT}$) as part of a closed-loop position control.

A further aspect of the present invention is a positioning arrangement for assembling an electrical cable, having a transport device, which is designed to position a front, free end of an inner conductor part, which is fastened on an inner conductor of the cable, by means of an infeed movement in an outer conductor part, which is to be fitted on the cable, in an axial setpoint position ($P_{SET}$) along a longitudinal axis (A) of the outer conductor part, characterized in that a sensor device is provided and is set up to measure an axial actual position ($P_{ACT}$) of the front end of the inner conductor part relative to the outer conductor part during the infeed, and wherein an open-loop and/or closed-loop control device is provided and is set up to calculate the setpoint position ($P_{SET}$) taking into consideration the measurement of the actual position ($P_{ACT}$) of the front end of the inner conductor part and taking into consideration a terminal spacing (y) between the front end of the inner conductor part and a front end, which faces the inner conductor part, of a supporting sleeve, which is fastened on the cable, and to position in the setpoint position ($P_{SET}$) by means of the transport device.

A further aspect of the present invention is a positioning arrangement characterized in that the sensor device has a sensing probe, an inductive sensor, a capacitive sensor and/or an optical sensor.

A further aspect of the present invention is a positioning arrangement characterized in that the sensor device is positioned and arranged fixedly in a defined manner relative to the outer conductor part.

A further aspect of the present invention is a computer program product having program code, means for implementing a positioning method when the program is executed on a closed-loop and/or open-loop control device of a positioning arrangement.

A further aspect of the present invention is an assembly method for assembling an electrical cable, in accordance with which a measurement method is implemented, whereafter a positioning method is implemented, and whereafter the supporting sleeve is fastened in the outer conductor part.

A further aspect of the present invention is an assembly arrangement for assembling an electrical cable, having a measurement arrangement and a positioning arrangement.

These and other aspects of the invention will be described and disclosed in detail herein, as is required.

BRIEF DESCRIPTIONS OF THE DRAWINGS

Functionally identical elements have been provided with the same reference symbols in the figures.

In the Figures, schematically:

DETAILED WRITTEN DESCRIPTION OF THE PREFERRED EMBODIMENTS

This disclosure of the invention is submitted in furtherance of the Constitutional purposes of the U.S. Patent Laws "to promote the progress of science and the useful arts." (Article 1, Section 8).

Figure 1:
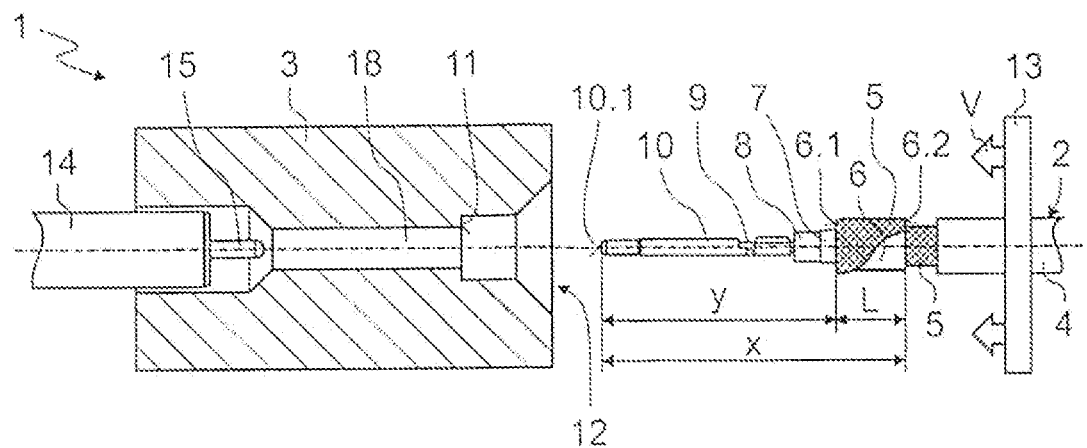
FIG. 1 is a sectional side view of a measurement arrangement according to the invention having a reference device, a sensor device and a prepared electrical cable during the insertion of the cable into the reference device by means of an infeed device.
Figure 2:
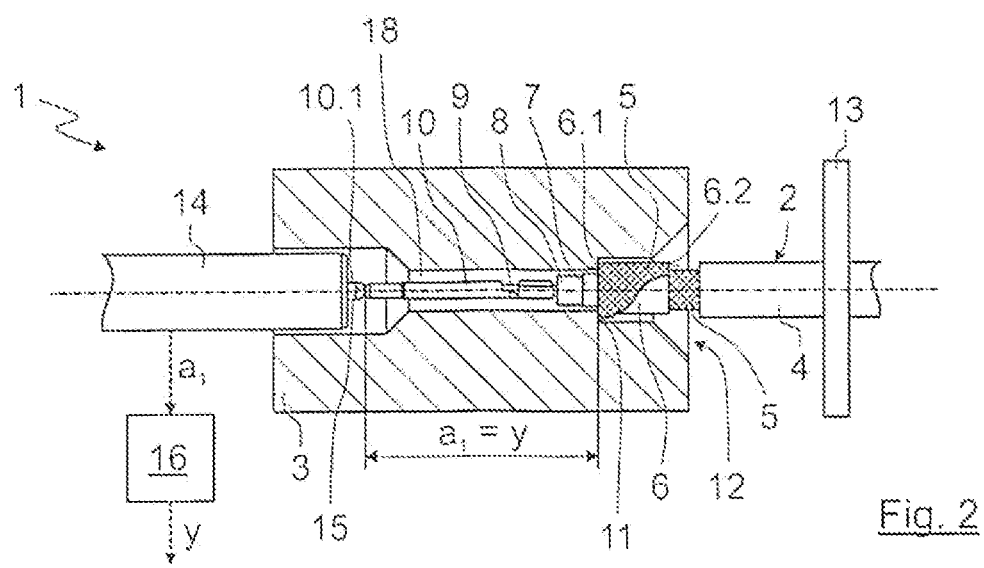
FIG. 2 is a sectional side view of the measurement arrangement of FIG. 1 showing a supporting sleeve, stopped against a reference stop, of the electrical cable during the detection of the axial spacing.

FIG. 1 shows a measurement arrangement 1 for assembling an electrical cable 2 having a reference device 3. In FIG. 1, the electrical cable 2 to be measured by means of the measurement method according to the invention is still located outside the reference device 3. In FIG. 2, the electrical cable 2 is illustrated inserted into the reference device 3.

For reasons of clarity, in FIGS. 1 to 6, the reference device 3 is in each case illustrated in sectioned form, whereas the cable 2 and the sensor device 14 (yet to be described below) are merely illustrated in an unsectioned side view.

As part of the assembly of electrical cables 2, it is necessary to consider a series of measures, in particular relative spacings of components of a plug-type connector to be fitted on the cable 2 and of the cable relative to one another in order, as a result, to be able to provide high-quality plug-type connections. A selection of relevant measures is illustrated using the electrical cable 2 illustrated by way of example in FIG. 1. The invention is suitable for measuring any desired electrical cables 2, but in particular for measuring coaxial cables which are already prepared, as is illustrated in FIG. 1.

The cable 2 illustrated by way of example in FIG. 1 has a front section from which a cable sheath 4 has been removed. A supporting sleeve 6 is fastened, preferably crimped, on the outer conductor 5, in this case a braided cable shield, which is located beneath the cable sheath 4. The outer conductor 5 or the braided cable shield can also have been folded back onto the supporting sleeve 6, as illustrated in FIGS. 1, 2, 5, 6 and 7, the outer conductor 5 is in each case not illustrated in a section on the supporting sleeve 6 in order to show the supporting sleeve 6 located therebeneath. In the exemplary embodiment, the supporting sleeve 6 is positioned on the outer conductor 5 of the cable 2 in such a way that another exposed section of the outer conductor 5 remains between a rear, cable-side end 6.2 of the supporting sleeve 6 and the cable sheath 4. In principle, provision may also be made, however, for the supporting sleeve 6 to be positioned axially on the cable 2 in such a way that said supporting sleeve 6 directly adjoins the cable sheath 4. In principle, the supporting sleeve 6 can also be fastened on the cable sheath 4 or partially on the cable sheath 4.

The electrical cable 2 illustrated by way of example also has a cable film 7, which is optionally located underneath the braided cable shield and under which there is a dielectric 8, which guides an inner conductor 9 of the cable 2 in it. An inner conductor part 10 has been fastened, in particular crimped, on the inner conductor 9 of the cable 2.

Probably one of the most relevant measures which needs to be taken into consideration in the assembly of such an electrical cable 2 is the terminal spacing y between the front, free end 10.1 of the inner conductor part 10 and a front end 6.1, which faces the inner conductor part 10, of the supporting sleeve 6. From the terminal spacing y it is also possible to derive other relevant measures, for example a spacing, referred to as "assembly spacing" x, between the front, free end 10.1 of the inner conductor part 10 and the rear end 6.2, remote from the inner conductor part 10, of the supporting sleeve 6. The assembly spacing x is also referred to in the field as "measure x" and results, for example, from the addition of the terminal spacing y and the total length L of the supporting sleeve 6.

As part of the measurement method according to the invention, provision is made for an end-side end 6.1, 6.2 of the supporting sleeve 6, which is fastened on the cable 2, to be brought to stop against a reference stop 11 of the reference device 3. As a result, an axial spacing $a_1$, $a_2$ between the front, free end 10.1 of the inner conductor part 10 and the reference stop 11 is detected, and from this the terminal spading y between the front, free end 10.1 of the inner conductor pail 10 and the front end 6.1 of the supporting sleeve 6 is derived.

In FIG. 2, the electrical cable 2 is brought with the front end 6.1 of the supporting sleeve 6 to stop against the reference stop 11 of the reference device 3. In this case, the detected axial spacing $a_1$ corresponds directly to the terminal spacing y, possibly taking into consideration a layer thickness of the outer conductor 5, which is turned back over the supporting sleeve 6, which layer thickness can generally be neglected, however.

As illustrated in FIGS. 1 to 6, the reference device 3 has a receptacle 12 for the inner conductor part 10 or for the cable 2, as a result of which the inner conductor part 10 can be inserted axially into the reference device 3 until the front end 6.1 of the supporting sleeve 6 stops against the reference stop 11. Preferably, the supporting sleeve 6 can be pressed mechanically against the reference stop 11 in order to enable as flat and ideal bearing as possible and therefore sufficiently accurate detection of the axial spacing $a_1$, $a_2$. In addition, by means of a sufficient contact pressure, the layer thickness of the outer conductor 5, which has been turned back over the supporting sleeve 6, can be of particularly little importance.

In order to bring the supporting sleeve 6 to stop against the reference stop 11, an infeed device 13 can be provided in order to move the cable 2 and/or the reference device 3. In the exemplary embodiments, an infeed device 13 is provided which has a gripping device (not illustrated in any more detail) for clamping the cable sheath 4 of the cable 2 and then performing a linear or axial movement in the feed direction V towards the reference device 3. The specific configuration of the infeed device 13 is not a matter of the invention, however.

The measurement arrangement 1 also provides a sensor device 14, which is designed to detect the axial spacing $a_1$, $a_2$. In principle, the sensor device 14 can have a sensing probe, an inductive sensor, a capacitive sensor and/or an optical sensor or can be designed in accordance with another technology. Preferably, as illustrated in the exemplary embodiments, a sensing probe 14 is used. Sensing probes are known in principle, for which reason the specifics of this technology will not be discussed in detail. The illustrated sensing probe 14 has a housing and a measurement tip 15, which is axially movable within a predetermined measurement range in order to detect an axial deviation from a defined zero point or a calibrated mid-position.

The sensor device 14, in particular the sensing probe 14, can be positioned and/or calibrated using the axial spacing of the front, free end of the inner conductor part of a reference cable (not illustrated). Such a reference cable has a setpoint terminal spacing and is brought to stop against the reference stop 11 for positioning and/or calibrating the sensor device or the sensing probe 14. By means of the sensor device, in particular the sensing probe 14, therefore, a deviation of the terminal spacing y of the cable 2 to be assembled from the setpoint terminal spacing of the reference cable can advantageously be determined.

In order to determine the terminal spacing y between the front, free end 10.1 of the inner conductor part 10 and the front end 6.1 of the supporting sleeve 6, an open-loop control device 16 can be provided, which receives the axial spacing $a_1$, $a_2$ between the front end 10.1 of the inner conductor part 10 and the reference stop 11, detected by means of the sensor device, in this case the sensing probe 14, as input signal and from this generates an output signal, which reflects the terminal spacing y. This is illustrated by way of example in FIG. 2 and in FIG. 6.

Figure 3:
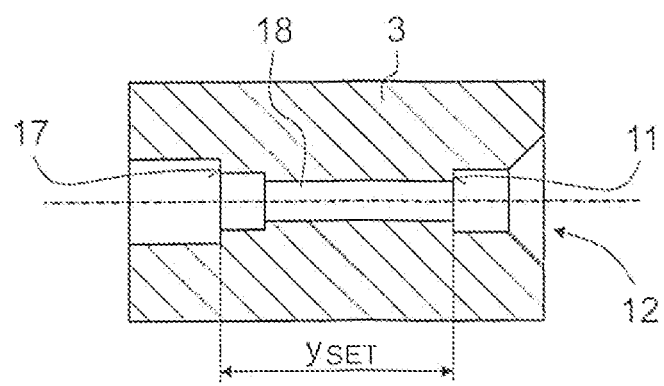
FIG. 3 is a sectional side view of a second embodiment of the reference device having a measurement stop opposite the reference stop.

A reference device 3 which differs from that in the exemplary embodiment in FIG. 1 is illustrated in FIG. 3. In the case of the reference device 3 illustrated in FIG. 3, positioning and/or calibration of the sensor device, in particular the sensing probe 14, by means of a reference cable can be avoided. The reference device 3 illustrated in FIG. 3 has a measurement stop 17. The measurement stop 17 is arranged opposite the reference stop 11. In this case, the measurement stop 17 and the reference stop 11 are arranged at opposite ends of a through-bore 18 which extends axially through the reference device 3, and are formed by a change in cross section of the through-bore 18 of the receptacle 12.

The sensor device, in this case the sensing probe 14, can be brought to stop against the measurement stop 18 of the reference device 3. The sensor device can be pressed mechanically against the measurement stop 18, for example, or fixed on the measurement stop 18. For example, the sensor device can also have a housing section formed integrally with the reference device 18. The sensor device and the electrical cable 2 are not shown in FIG. 3 in order to simplify the illustration.

Owing to the known spacing between the measurement stop 13 and the reference stop 11, the sensor device can be positioned and/or calibrated, in particular taking into consideration an ideal terminal spacing $y_{SET}$.

Figure 4:
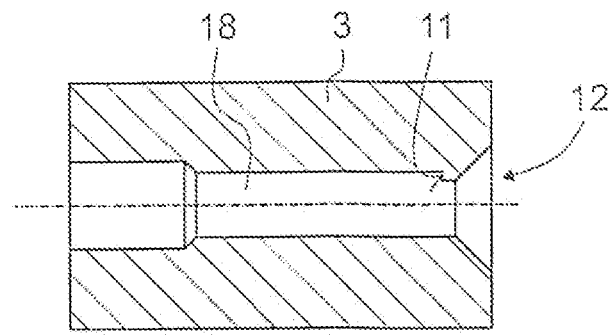
FIG. 4 is a sectional side view of a third embodiment of the reference device having a reference stop which is designed to stop the supporting sleeve with its rear end.
Figure 5:
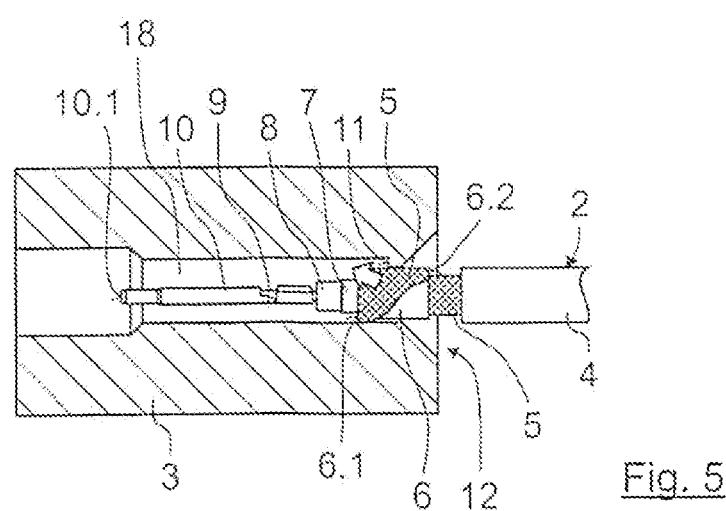
FIG. 5 is a sectional side view of the reference device of FIG. 4 during the insertion of the electrical cable.
Figure 6:
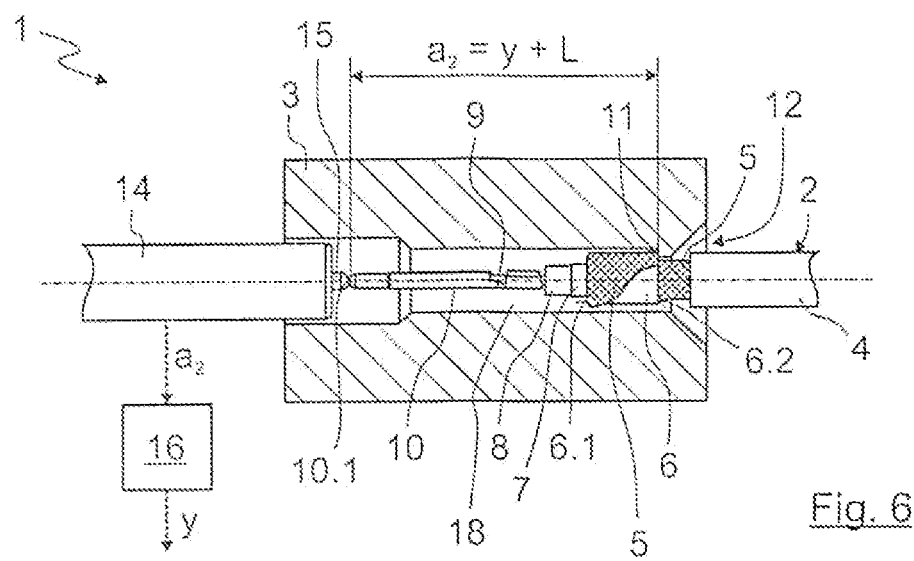
FIG. 6 is a sectional side view of the reference device of FIG. 4 with the supporting sleeve stopped at the rear against the reference stop during the detection of the axial spacing.
Figure 7:
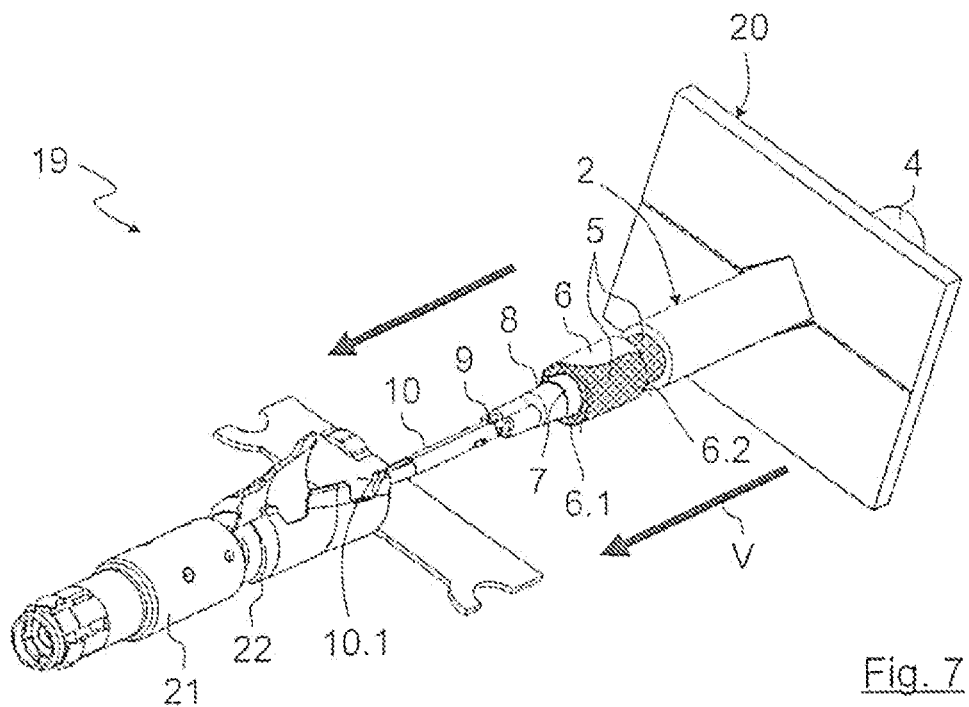
FIG. 7 is a perspective view of the positioning of an inner conductor part in an outer conductor part, which is to be fitted on the cable, by means of a positioning arrangement.

Within the scope of the exemplary embodiment in FIG. 2, it is illustrated how the terminal spacing y can be determined using the axial spacing $a_1$ when the front end 6.1 of the supporting sleeve 6 is stopped against the reference stop 11 of the reference device 3. Alternatively, it is also possible to bring the rear end 6.2 of the supporting sleeve 6 to stop against the reference stop 11. A corresponding exemplary embodiment is illustrated in FIGS. 4 to 6. The reference device 3 can in this case have a reference stop 11 in the form of a web protruding into the receptacle 12, wherein the supporting sleeve 6, as illustrated in FIG. 5, can first be pushed axially past said web and then, as a result of the electrical cable 2 being shifted in the receptacle 12 substantially orthogonally with respect to the insertion movement or feed direction, and possibly an axial movement drawing back counter to the insertion movement, can be stopped at the rear side against the reference stop 11.

As illustrated in FIG. 6, the terminal spacing y in this variant embodiment can be calculated (for example using the open-loop control device 16) by virtue of a total length L of the supporting sleeve 6 being subtracted from the detected axial spacing $a_2$. The total length L of the supporting sleeve 6 can in this case be detected in advance by measurement or used as constant and sufficiently accurately known.

A computer program product having program code means can be provided in order to implement the described measurement method on the open-loop control device 16.

The invention also relates to a positioning method for assembling an electrical cable 2, which is illustrated using a positioning arrangement 19 in FIGS. 7 to 10. The features of the measurement arrangement 1 described in FIGS. 1 to 6 can also be provided in the exemplary embodiments relating to the positioning arrangement 19; this applies in particular to the design of the prepared cable 2 and to the sensor device or the sensing probe 14. Subassemblies of the measurement arrangement 1 can therefore be reused in a sensible manner in the positioning device 19—this is not necessarily provided, however.

The positioning arrangement 19 has a transport device 20, which is designed to position a front, free end 10.1 of an inner conductor part 10, which is fastened on an inner conductor 9 of the cable 2, by means of an infeed movement along a feed direction V in an outer conductor part 21, which is to be fitted on the cable 2, in an axial setpoint position $P_{SET}$ (cf. FIG. 8) along a longitudinal axis A of the outer conductor part 21. The transport device 20 can therefore be identical to the infeed device 13.

For example, in order to clarify the positioning method, or the mode of operation of the positioning arrangement 19, a prepared cable 2 having an identical design to the above embodiments is used. In principle, the positioning method can nevertheless be usable for any desired electrical cable 2, but in particular a coaxial cable having a single inner conductor 9.

Figure 8:
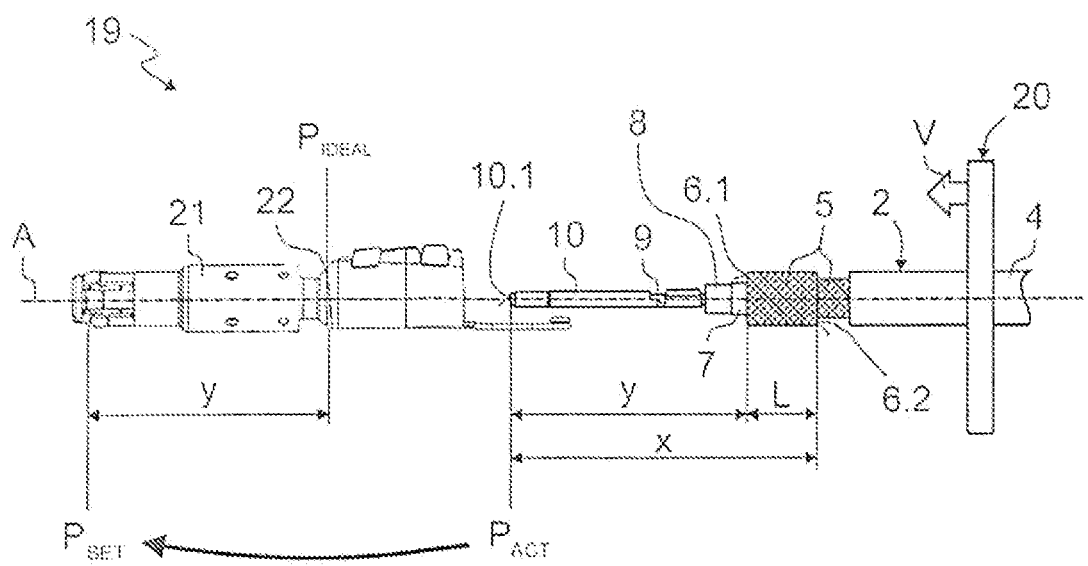
FIG. 8 is an orthographic side view of the positioning arrangement of FIG. 7.

The geometric relationships are illustrated in particular in FIG. 8, which shows a side view of the positioning arrangement 19 according to the invention.

In principle, the transport device 20 can be designed to move the electrical cable 2 and/or the outer conductor part 21 in order to insert the inner conductor part 10 into the outer conductor part 21. Preferably, the transport device 20 is nevertheless designed to only move the electrical cable 2. In the exemplary embodiments, the cable 2 is clamped in a gripping device, which can then be shifted linearly along the longitudinal axis A of the outer conductor part 21 in the feed direction V in order to position the inner conductor part 10 in the outer conductor part 21. The specific configuration of the transport device 20 is not a matter covered by the scope of the invention.

Provision is made for the setpoint position $P_{SET}$ of the inner conductor part 10 in the outer conductor part 21 to be calculated taking into consideration a terminal spacing y between the front end 10.1 of the inner conductor part 10 and a front end 6.1, which faces the inner conductor part 10, of a supporting sleeve 6, which is fastened on the cable 2, wherein during the infeed movement, an axial actual position $P_{ACT}$ of the front end 10.1 of the inner conductor part 10 relative to the outer conductor part 21 is measured.

Figure 9:
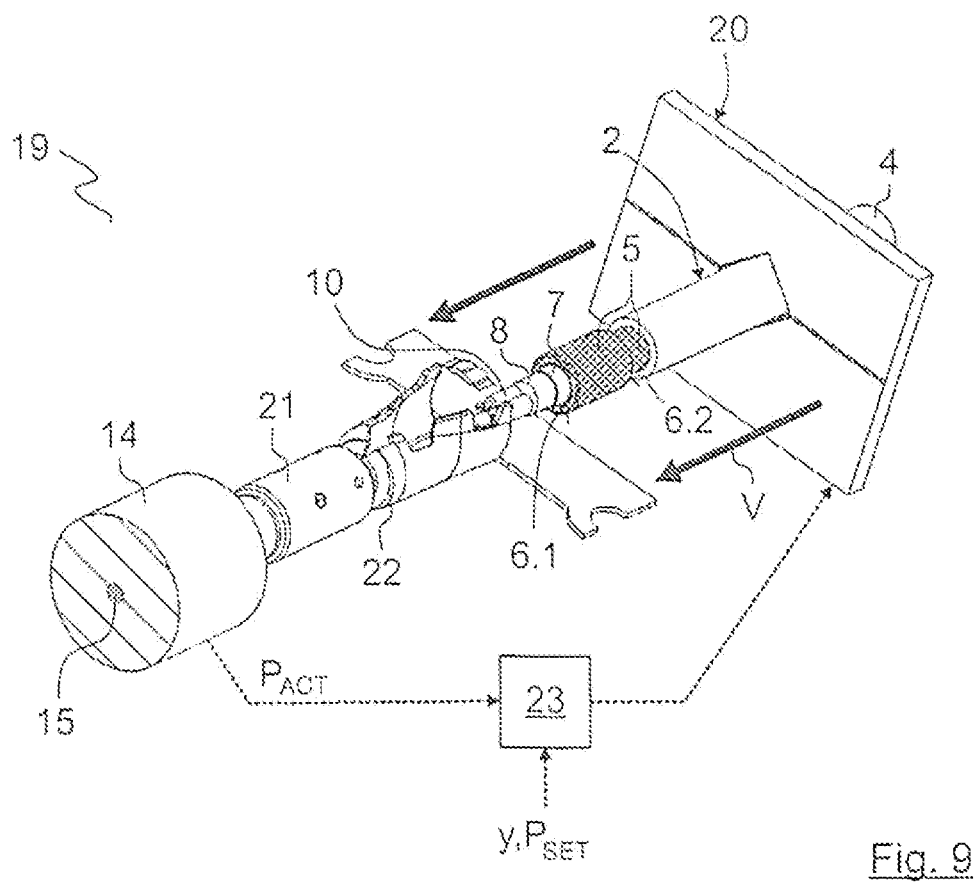
FIG. 9 is a perspective view of the positioning arrangement of FIG. 7 during the insertion of the inner conductor part into the outer conductor part with a sensor device positioned in a defined manner relative to the outer conductor part.
Figure 10:
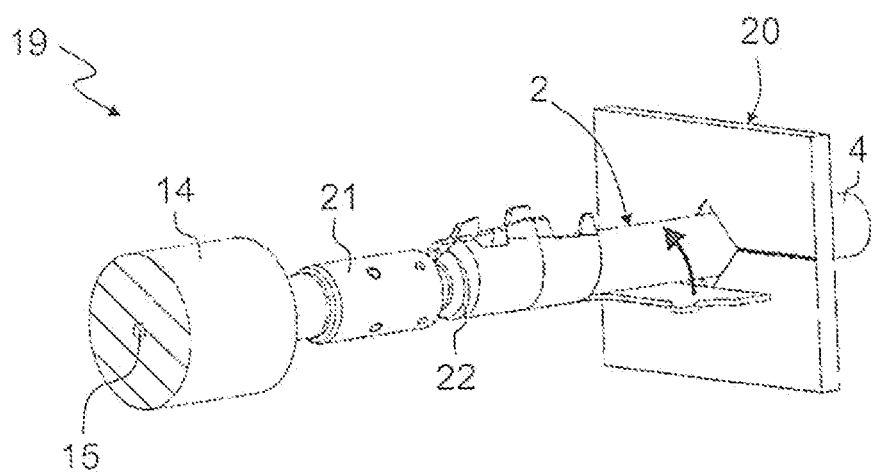
FIG. 10 is a perspective view of the positioning arrangement of FIG. 7 with an inner conductor part fixed in the axial setpoint position in the outer conductor part ring the fastening of the outer conductor part on the electrical cable.

The axial actual position $P_{ACT}$ of the front end 10.1 of the inner conductor part 10 relative to the outer conductor part 21 is measured in the exemplary embodiment by means of a sensor device 14 (illustrated in FIGS. 9 and 10). In principle, the sensor device 14 can have a sensing probe, an inductive sensor, a capacitive sensor and/or an optical sensor. Preferably, as illustrated in the exemplary embodiment, a sensing probe 14 is provided, which can have an identical design, for example, to the sensing probe 14 of the measurement arrangement 1.

The terminal spacing y for determining the setpoint position $P_{SET}$ can be assumed to be known within the scope of the positioning method according to the invention, but can preferably be detected by means of a previously implemented measurement method for assembling an electrical cable 2, in particular using the measurement method described within the scope of the invention.

The setpoint position $P_{SET}$ can furthermore be calculated on the basis of an axial ideal position $P_{IDEAL}$ (cf. FIG. 8) of the supporting sleeve 6 in the outer conductor part 21 for subsequent fastening of the outer conductor part 21 on the supporting sleeve 6. In particular, the axial ideal position $P_{IDEAL}$ of the supporting sleeve 6 in the outer conductor part 21 can be determined corresponding to the position of the front end 6.1 of the supporting sleeve 6 on an inner shoulder 22 of the outer conductor part 21.

As a result of the fact that the supporting sleeve 6 can now be positioned optimally on the inner shoulder 22 of the outer conductor part 21 by virtue of the setpoint position $P_{SET}$ being determined taking into consideration the individual terminal spacing y of the electrical cable 2 to be assembled and being monitored using measurement technology, it is possible to avoid an air gap between the supporting sleeve 6 and the shoulder 22 of the outer conductor part 21 which would cause a sudden change in impedance and therefore an impairment of the electrical transition between the electrical cable 2 and the plug-type connector to be fitted.

The front end 10.1 of the inner conductor part 10 and therefore the setpoint or actual position $P_{SET}$, $P_{ACT}$ of the inner conductor part 10 in the outer conductor part 21 can be detected advantageously using measurement technology in particular when the sensor device or the sensing probe 14 is positioned and arranged fixedly in a defined manner relative to the outer conductor part 21, as illustrated in FIGS. 9 and 10. Using the sensing probe 14, the actual position $P_{ACT}$ of the cable 2 to be assembled can be measured, in particular in the front section, which is relevant for the positioning, of the outer conductor part 21. The sensing probe 14 can in this case be positioned and/or calibrated taking into consideration the ideal position $P_{IDEAL}$ of a reference cable (not illustrated) in the outer conductor part 21 using the determination of a setpoint position for the reference cable.

The actual position $P_{ACT}$ of the front end 10.1 of the inner conductor part 10 can be measured continuously or time-discretely during the infeed. Preferably, provision can be made for the inner conductor part 10 to be positioned in the outer conductor part 21 taking into consideration the measured actual position $P_{ACT}$ as part of a closed-loop position control.

An open-loop and/or closed-loop control device 23 (cf. FIG. 9) can be provided and set up to calculate the setpoint position $P_{SET}$ taking into consideration the measurement of the actual position $P_{ACT}$ of the front end 10.1 of the inner conductor part 10 and taking into consideration the terminal spacing y between the front end 10.1 of the inner conductor part 10 and the front end 6.1 of the supporting sleeve 6, which is fastened on the cable 2, and to position in the setpoint position $P_{SET}$ by means of the transport device 20, as indicated in FIG. 9. A computer program product having program code means can be provided in order to implement a positioning method described here on the closed-loop and/or open-loop control device 23.

Following the positioning of the inner conductor part 10 in the setpoint position $P_{SET}$ within the outer conductor part 21, the outer conductor part 21 can be fastened, preferably crimped, on the cable 2, in particular the supporting sleeve 6 and/or the outer conductor 5 of the cable 2, as is indicated in FIG. 10.

Figure 11:
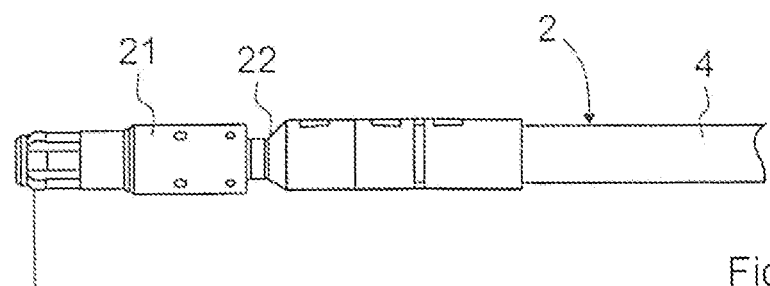
FIG. 11 is an orthographic side view of the outer conductor part which is completely fastened on the cable prior to fitting in a plug-type connector housing.

An electrical cable 2 which has been prepared with the inner conductor part 10 and the outer conductor part 21 is illustrated in FIG. 11. In a subsequent step, the cable 2 prepared in this way can be inserted and latched into a housing part of a plug-type connector (not illustrated).

Figure 12:
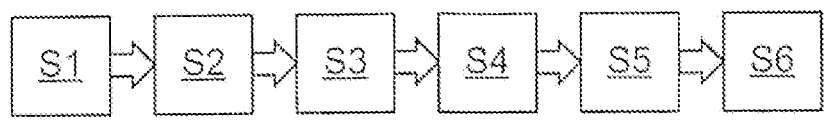
FIG. 12 is a block diagram of the assembly method, according to the invention, for assembling an electrical cable.

The invention also relates to an assembly method for assembling an electrical cable 2. An exemplary assembly method is illustrated in FIG. 12.

The principal required steps in the assembly of the electrical cable 2 are known and can be performed using one or more assembly arrangements or automatic assembly machines. The arrangement described below should merely be understood by way of example and sometimes is also only reproduced incompletely.

In a first step S1, as part of an assembly method according to the invention, a supporting sleeve 6 is fastened, preferably crimped, on an outer conductor 21 of an electrical cable 2.

Then, in a second step S2, an inner conductor part 10 can be fastened, preferably crimped, on an inner conductor 9 of the cable 2.

In a third step S3, a measurement method according to the invention in accordance with the above embodiments can be implemented.

In a fourth step S4, a positioning method in accordance with the above embodiments is implemented.

Finally, in a fifth step S5, the supporting sleeve 6 can be fastened, preferably crimped, in the outer conductor part 21.

In a sixth step S6, the thereby prepared electrical cable 2 can be introduced and possibly latched into a housing, preferably a plastic housing, of a plug-type connector.

Operation

Having described the structure of our Measurement and Positioning Methods and Arrangements for Assembling an Electrical Cable, its operation is briefly described.

A first object of the present invention is a measurement method for assembling an electrical cable (2), the electrical cable (2) having a supporting sleeve (6) with an end-side end, the supporting sleeve (6) being fastened on the electrical cable (2), and having an inner conductor part (10) with a front, free end (10.1), the inner conductor part (10) being fastened on an inner conductor (9) of the electrical cable (2), comprising the steps: providing a reference device (3) that has a reference stop (11); bringing the end-side end of the supporting sleeve (6) to stop against the reference stop (11) of the reference device (3); detecting an axial spacing ($a_1$, $a_2$) between the front, free-end (10.1) of the inner conductor part (10) and the reference stop (11); and deriving a terminal spacing (y) between the front, free end (10.1) of the inner conductor part (10) and the end-side end of the supporting sleeve (6) which faces the inner conductor part (10) from the detected axial spacing ($a_1$, $a_2$).

A second object of the present invention is a measurement method wherein the detected axial spacing ($a_1$) corresponds to the terminal spacing (y) when a front end (6.1) of the supporting sleeve (6) is brought to stop against the reference stop (11) during the detection of the axial spacing ($a_1$).

A third object of the present invention is a measurement method wherein the inner conductor part (10) is inserted axially into a receptacle (12) of the reference device (3) until the front end (6.1) of the supporting sleeve (6) stops against the reference stop (11).

A fourth object of the present invention is a measurement method wherein the terminal spacing (y) is calculated by a total length (L) of the supporting sleeve (6) being subtracted from the detected axial spacing ($a_2$) when a rear end (6.2), of the supporting sleeve (6), which is remote from the inner conductor part, is brought to stop against the reference stop (11) during the detection of the axial spacing ($a_2$).

A fifth object of the present invention is a measurement method wherein the supporting sleeve (6) is fastened, preferably crimped, on an outer conductor (5) of the electrical cable (2).

A sixth object of the present invention is a measurement method wherein the supporting sleeve (6) is pressed mechanically against the reference stop (11).

A seventh object of the present invention is a measurement method and further comprising: a sensor device, and the sensor device detects the axial spacing ($a_1$, $a_2$) between the front, free end (10.1) of the inner conductor part (10) and the reference stop (11).

An eighth object of the present invention is a measurement method wherein the sensor device is an inductive sensor, or a capacitive sensor and/or an optical sensor.

A ninth object of the present invention is a measurement method wherein the reference device (3) defines a through-bore (18), and the through-bore (18) has mutually remote ends, and the sensor device (14) is brought to stop against a measurement stop (17) of the reference device (3), and wherein the measurement stop (17) and the reference stop (11) are arranged at the mutually remote ends of the through-bore (18).

A tenth object of the present invention is a measurement method wherein the sensor device (14) is pressed mechanically against the measurement stop (17) or fixed on the measurement stop (17).

An eleventh object of the present invention is a measurement method wherein the supporting sleeve of a reference cable, which has a setpoint terminal spacing, is brought to stop against the reference stop (11), and whereafter the sensor device (14) is positioned and/or calibrated using the detected axial spacing between the front, free end of the inner conductor part of the reference cable and the reference stop (11).

A twelfth object of the present invention is a measurement method characterized in that any deviation of the terminal spacing (y) of the electrical cable (2) to be assembled from the setpoint terminal spacing of the reference cable is determined by means of the sensor device (14).

A thirteenth object of the present invention is a measurement arrangement (1) for assembling an electrical cable (2), comprising: a reference device (3) having a reference stop; (11), an infeed device (13), which is designed to bring an end-side end (6.1, 6.2) of a supporting sleeve (6), which is fastened on the electrical cable (2), to stop against, the reference stop; and (11), a sensor device (14), which detects an axial spacing ($a_1$, $a_2$) between a front, free end (10.1) of an inner conductor part (10), which is fastened on an inner conductor (9) of the electrical cable (2), and the reference stop (11).

A fourteenth object of the present invention is a measurement arrangement (1), and further comprising: providing an open-loop control device (16) to derive a terminal spacing (y) between the front, free end (10.1) of the inner conductor part (10) and a front end (6.1), of the supporting sleeve (6), which faces the inner conductor part (10), from the detected axial spacing ($a_1$, $a_2$).

A fifteenth object of the present invention is a measurement arrangement (1) wherein the reference device (3) has a receptacle (12) for the inner conductor part (10) of the electrical cable (2).

A sixteenth object of the present invention is a measurement arrangement (1) wherein the reference device (3) has a measurement stop (17), and the measurement stop (17) and the reference stop (11) are arranged at mutually remote ends of a through-bore (18), which extends axially through the reference device (3).

A seventeenth object of the present invention is a positioning method for assembling an electrical cable (2), the electrical cable (2) having an inner conductor part (10) with a front, free end (10.1), the inner conductor part (10) being fastened on an inner conductor (9) of the electrical cable (2), and having a supporting sleeve (6) with a front end (6.1), which faces the inner conductor part (10), the supporting sleeve (6) being fastened on the electrical cable (2), comprising the steps: providing an outer conductor part (21) that has a longitudinal axis (A); determining a terminal spacing (y) between the front, free-end (10.1) of the inner conductor part (10) and the front end (6.1) of the supporting sleeve (6); feeding-in and positioning the front, free-end (10.1) of the inner conductor part (10) in the outer conductor part (21) in an axial set point ($P_{set}$) position along the longitudinal axis (A) of the outer conductor part (21), and wherein the axial set point ($P_{set}$) position is calculated taking into consideration the determined terminal spacing (y); and wherein during the infeed movement, an axial actual position ($P_{act}$) of the front, free-end (10.1) of the inner conductor part (10) relative to the outer conductor part (21) is measured.

A twentieth object of the present invention is a positioning method characterized in that the axial setpoint position ($P_{SET}$) is calculated on the basis of an axial ideal position ($P_{IDEAL}$) of the supporting sleeve (6) in the outer conductor part (21) for subsequent fastening of the outer conductor part (21) on the supporting sleeve (6).

A twenty-first object of the present invention is a positioning method characterized in that the electrical cable (2) is clamped in a gripping device, whereafter the gripping device is shifted linearly along the longitudinal axis (A) of the outer conductor part (21) in order to position the inner conductor part (10) in the outer conductor part (21).

A twenty-second object of the present invention is a positioning arrangement (19) for assembling an electrical cable (2), comprising: a transport device (20) that provides infeed movement to position a front, free end (10.1) of an inner conductor part (10) that is fastened on an inner conductor (9) of the electrical cable (2) in an outer connector part (21) in an axial set point position ($P_{set}$) along a longitudinal axis (A) of the outer connector part (21); a sensor device (14) to measure an axial actual position ($P_{act}$) of the front, free end (10.1) of the inner connector part (10) relative to the outer conductor part (21) during the infeed movement; and wherein an open loop and/or closed-loop control device (23) calculates the setpoint position ($P_{set}$) taking into consideration the axial actual position ($P_{act}$) of the front, free end (10.1) of the inner connector part (10) and taking into consideration a terminal spacing (y) between the front, free end (10.1) of the inner connector part (10) and a front end (6.1) of a supporting sleeve (6) which is fastened on the electrical cable (2), the front end (6.1) facing the inner conductor part (10), and wherein the open loop and/or closed loop control device (23) is set up to position the front, free end (10.1) of the inner conductor part (10) in the set point position ($P_{set}$) by means of the transport device (20).

A twenty-third object of the present invention is a measurement method wherein the sensor device is fixed on the measurement stop.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

The invention claimed is:

1. A measurement method for assembling an electrical cable, the electrical cable having a supporting sleeve with an end-side end, the supporting sleeve being fastened on the electrical cable, and the supporting sleeve has an inner conductor part with a front, free end, the inner conductor part being fastened on an inner conductor of the electrical cable, the method comprising the steps:
providing a reference device that has a reference stop;
bringing the end-side end of the supporting sleeve to stop against the reference stop of the reference device; and
providing a sensor device, and the sensor device detects an axial spacing between the front, free end of the inner conductor part and the reference stop; and
deriving a terminal spacing between the front, free end of the inner conductor part and the end-side end of the supporting sleeve which faces the inner conductor part from the detected axial spacing.

2. The measurement method as claimed in claim 1, and wherein the detected axial spacing corresponds to the terminal spacing when the end side end of the supporting sleeve is brought to stop against the reference stop during the detection of the axial spacing.

3. The measurement method as claimed in claim 1 and wherein the inner conductor part is inserted axially into a receptacle of the reference device until the end side end of the supporting sleeve stops against the reference stop.

4. The measurement method as claimed in claim 1, and wherein the terminal spacing is calculated by a total length of the supporting sleeve being subtracted from the detected axial spacing when a rear end, of the supporting sleeve, which is remote from the inner conductor part, is brought to stop against the reference stop during the detection of the axial spacing.

5. The measurement method as claimed in claim 1, and wherein the supporting sleeve is fastened on an outer conductor of the electrical cable.

6. The measurement method as claimed in claim 1, and wherein the supporting sleeve is pressed mechanically against the reference stop.

7. The measurement method as claimed in claim 1, and wherein the sensor device is an inductive sensor, or a capacitive sensor or an optical sensor.

8. The measurement method as claimed in claim 1 and wherein the reference device defines a through-bore, and the through-bore has mutually remote ends, and the sensor device is brought to stop against a measurement stop of the reference device, and wherein the measurement stop and the reference stop are arranged at the mutually remote ends of the through-bore.

9. The measurement method as claimed in claim 8, and wherein the sensor device is pressed mechanically against the measurement stop.

10. The measurement method as claimed in claim 8, and wherein the sensor device is fixed on the measurement stop.

11. The measurement method as claimed in claim 1 and wherein the supporting sleeve of a reference cable, which has a setpoint terminal spacing, is brought to stop against the reference stop, and whereafter the sensor device is positioned and/or calibrated using the detected axial spacing between the front, free end of the inner conductor part of the reference cable and the reference stop.

12. The measurement method as claimed in claim 11, characterized in that any deviation of the terminal spacing of the electrical cable to be assembled from the setpoint terminal spacing of the reference cable is determined by the sensor device.

* * * * *